No. 725,498. PATENTED APR. 14, 1903.
P. T. SIEVERT.
APPARATUS FOR MANUFACTURING SHEET GLASS.
APPLICATION FILED DEC. 26, 1901.

NO MODEL.

Fig. 2ª.

Fig. 4ª.

Witnesses:
Henry Thieme
George Barry Jr.

Inventor:
Paul Theodor Sievert
by attorneys
Brown & Seward

UNITED STATES PATENT OFFICE.

PAUL THEODOR SIEVERT, OF DRESDEN, GERMANY.

APPARATUS FOR MANUFACTURING SHEET-GLASS.

SPECIFICATION forming part of Letters Patent No. 725,498, dated April 14, 1903.

Application filed December 26, 1901. Serial No. 87,202. (No model.)

*To all whom it may concern:*

Be it known that I, PAUL THEODOR SIEVERT, a subject of the King of Saxony, and a resident of Dresden, in the Kingdom of Saxony, German Empire, have invented a new and useful Improvement in Apparatus for Manufacturing Sheet-Glass, of which the following is a specification.

This improvement relates to an apparatus for manufacturing sheet-glass by the process which forms the subject-matter of my application Serial No. 87,201, filed December 26, 1901, for United States patent. According to that process a hot liquid layer of glass is spread out upon the perforated surface of a hollow plate, upon which it is held down by a shape-giving frame and while so held is exposed to an elastic-pressure medium and thereby expanded into a hollow body, which is so retained in the final expanding process by a skeleton form or mold that portions of it are formed into panels, which on being separated and flattened form plates in which the natural fire-polish on the two surfaces of the glass is retained.

Figure 1:
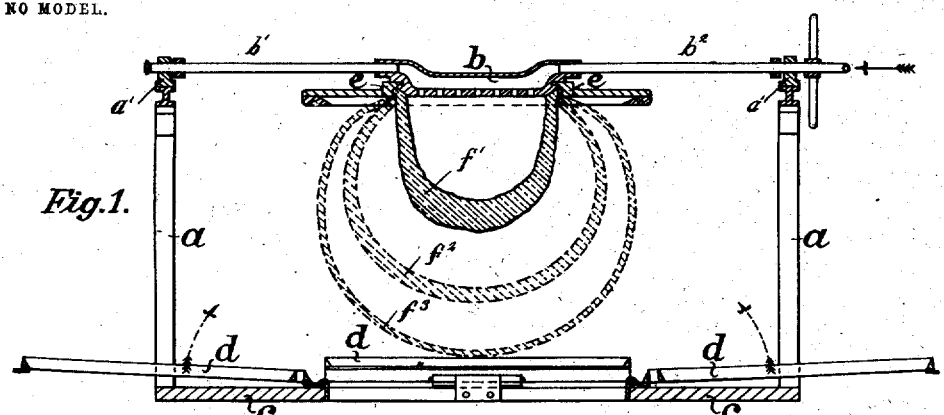
Figure 2:
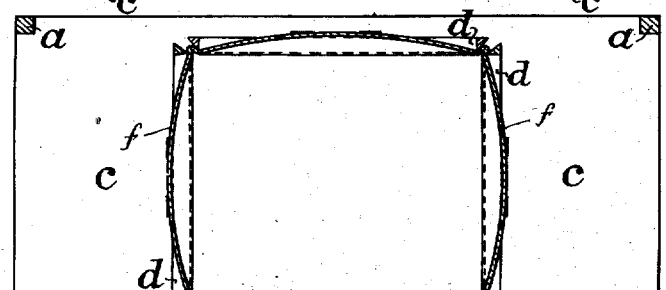
Figure 3:
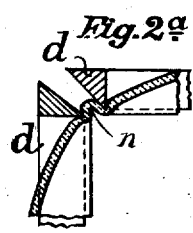
Figure 3:
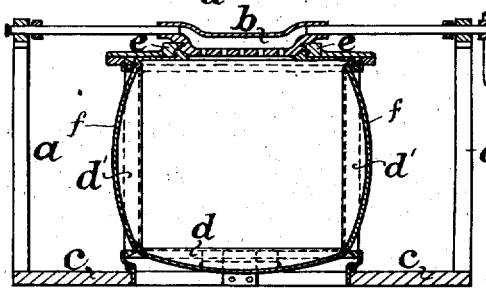
Figure 4:
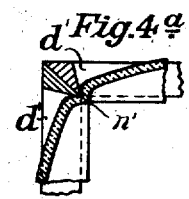
Figure 4:
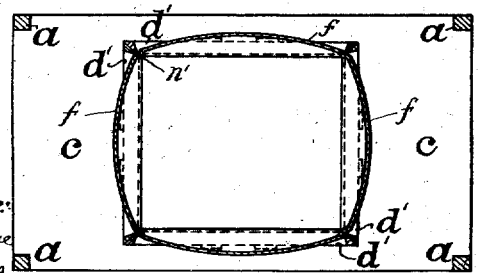
Figure 5:
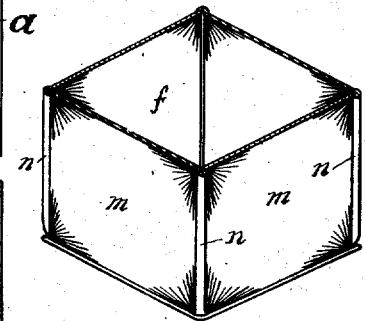

Figure 1 is an upright view, partly in section, of a complete apparatus embodying my invention, showing the hot glass in several stages of expanding, the skeleton mold or form being open during such stages of expansion. Fig. 2 is a plan corresponding with Fig. 1, partly in section, showing the blown-glass body within the closed skeleton form or mold, the upper hollow plate being removed. Fig. 2ª represents a part of Fig. 2 on a larger scale. Fig. 3 is an upright view of the apparatus partly in section and with the skeleton form or mold closed and including the blown hollow glass body. Fig. 4 is a plan corresponding with Fig. 3, partly in section, showing the blown-glass body within the skeleton form or mold, the upper hollow plate being removed. Fig. 4ª represents a part of Fig. 4 on a larger scale. Fig. 5 is a perspective view of a glass body which has been blown out within the skeleton form or mold, but which has been taken out therefrom.

Referring first to Fig. 1, $a$ represents the uprights, erected on the base-plate $c$ and carrying the boxes $a'$, which receive the trunnions $b'$ $b^2$ of the hollow plate $b$, with perforated surface upon which the hot layer of glass is deposited. The trunnion $b^2$ is hollow and constitutes the conduit through which the compressed air or other pressure medium enters the cavity of said plate. $e$ is the frame of suitable shape by which the glass layer is held on said perforated surface. The said plate and frame, which are shown upside down, are such as are shown in my United States Patent No. 641,048, dated January 9, 1900.

The base-plate $c$ has a suitable central opening, around which is arranged the skeleton form or mold composed of fillets $d$, hinged to said plate, so that they may be turned, as indicated by the arrows in Fig. 1, to an upright position and may be kept in such position by connecting them in any suitable manner to the upper frame $e$. The said fillets $d$, by which the corners of the hollow glass body $f$ are formed, may be spaced to form double edges, as shown in Figs. 2 and 2ª, or may be arranged to come close together to form a single edge, (shown at $d'$ in Figs. 4 and 4ª.)

When the skeleton form or mold represented in Figs. 1 and 2 is closed, its fillets $d$, presenting double edges, will form at the corners slits within which, as shown in Figs. 2, 2ª, and 5, the glass at the corners of the hollow glass body will bulge out, the so-bulged-out parts $n$ forming the separating-lines at which the body may be divided into sheets.

When the skeleton form or mold represented in Figs. 4 and 4ª is closed, its sharp fillets $d'$, presenting together single edges, will form corners at which the glass will be bulged inward during expansion, the so-bulged-in parts $n'$ forming the separating-lines on which to divide the body into sheets. The fillets $d$ $d'$ must be so hinged that if they are closed to form the skeleton form or mold they may easily be turned away from the bulged-out or bulged-in part of the glass body when the hot glass has solidified so far that the hollow body may be removed from the plate $b$ or from the shaping-frame $e$.

It is indicated in Fig. 1 how the sagging or sinking and the blowing of the glass body $f$ in the different stages $f'$ $f^2$ $f^3$ is proceeded with until the closing of the skeleton form or mold may take place, as shown in Fig. 3, whereupon by the continued blowing out the ball-like body will meet against the cornerfillets, thereby, according to Figs. 2, 2ª, and 5, bulging out at the corners $n$, and, according to Figs. 3, 4, and 4ª, bulging in at the corners $n'$, the intermediate portions $m$ in both cases being expanded outwardly beyond the fillets in the form of panels $m$ until the admission of the elastic-pressure medium is shut off. The body now has the form of a hollow cube or prism with bulged-out sides.

After sufficient solidification of the glass the upright fillets $d$ are turned down and the glass body is removed from the shaping-frame $e$. The body may now be at once divided at its corners $n$ or $n'$ by cutting or by any means known to glass-workers into panels $m$, which have only to be flattened by any of the means known to glass-blowers to produce plates.

What I claim as my invention is—

In apparatus for the manufacture of sheet-glass, the combination of means for expanding a hot layer of glass to form a hollow body, and a skeleton form or mold consisting of a base-plate and sharp-edged fillets hinged thereto for the reception of the so-expanded body and the formation of the corners thereon or therein.

In testimony that I claim the foregoing as my invention I have signed my name, in presence of two witnesses, this 10th day of December, 1901.

PAUL THEODOR SIEVERT.

Witnesses:
 HERNANDO DE SOTO,
 PAUL ARRAS.

---

Correction in Letters Patent No. 725,498.

It is hereby certified that in Letters Patent No. 725,498, granted April 14, 1903, upon the application of Paul Theodor Sievert, of Dresden, Germany, for an improvement in "Apparatus for Manufacturing Sheet-Glass," an error appears in the printed specification requiring correction, as follows: In line 25, page 2, the word "the" should be stricken out; and that the said Letters Patent should be read with this correction therein that the same may conform to the record of the case in the Patent Office.

Signed and sealed this 21st day of April, A. D., 1903.

[SEAL.]

F. I. ALLEN,
*Commissioner of Patents.* fillets, thereby, according to Figs. 2, 2ª, and 5, bulging out at the corners $n$, and, according to Figs. 3, 4, and 4ª, bulging in at the corners $n'$, the intermediate portions $m$ in both cases being expanded outwardly beyond the fillets in the form of panels $m$ until the admission of the elastic-pressure medium is shut off. The body now has the form of a hollow cube or prism with bulged-out sides.

After sufficient solidification of the glass the upright fillets $d$ are turned down and the glass body is removed from the shaping-frame $e$. The body may now be at once divided at its corners $n$ or $n'$ by cutting or by any means known to glass-workers into panels $m$, which have only to be flattened by any of the means known to glass-blowers to produce plates.

What I claim as my invention is—

In apparatus for the manufacture of sheet-glass, the combination of means for expanding a hot layer of glass to form a hollow body, and a skeleton form or mold consisting of a base-plate and sharp-edged fillets hinged thereto for the reception of the so-expanded body and the formation of the corners thereon or therein.

In testimony that I claim the foregoing as my invention I have signed my name, in presence of two witnesses, this 10th day of December, 1901.

PAUL THEODOR SIEVERT.

Witnesses:
HERNANDO DE SOTO,
PAUL ARRAS.

---

Correction in Letters Patent No. 725,498.

It is hereby certified that in Letters Patent No. 725,498, granted April 14, 1903, upon the application of Paul Theodor Sievert, of Dresden, Germany, for an improvement in "Apparatus for Manufacturing Sheet-Glass," an error appears in the printed specification requiring correction, as follows: In line 25, page 2, the word "the" should be stricken out; and that the said Letters Patent should be read with this correction therein that the same may conform to the record of the case in the Patent Office.

Signed and sealed this 21st day of April, A. D., 1903.

[SEAL.]

F. I. ALLEN,
*Commissioner of Patents.*

It is hereby certified that in Letters Patent No. 725,498, granted April 14, 1903, upon the application of Paul Theodor Sievert, of Dresden, Germany, for an improvement in "Apparatus for Manufacturing Sheet-Glass," an error appears in the printed specification requiring correction, as follows: In line 25, page 2, the word "the" should be stricken out; and that the said Letters Patent should be read with this correction therein that the same may conform to the record of the case in the Patent Office.

Signed and sealed this 21st day of April, A. D., 1903.

[SEAL.]

F. I. ALLEN,
*Commissioner of Patents.*